June 29, 1943.  P. W. MOLLENHAUER  2,322,871
HANDLE FOR MILK CANS
Filed March 12, 1941

INVENTOR.
PAUL W. MOLLENHAUER
BY
*Flournoy Corey*
ATTORNEY.

Patented June 29, 1943

2,322,871

UNITED STATES PATENT OFFICE 2,322,871

HANDLE FOR MILK CANS

Paul W. Mollenhauer, Alburnett, Iowa

Application March 12, 1941, Serial No. 382,959

1 Claim. (Cl. 220—94)

This invention relates to milk and cream cans or the like and has particular relation to improved means for handling such containers.

Containers such as those used in carrying milk and cream or the like from the farm to the dairy or creamery are relatively heavy and difficult to handle when filled. Most such cans have a capacity of from five to fifteen gallons each and are usually provided with a pair of bent or U-shaped handles secured by welding or riveting near the upper edge of the container and on opposite sides thereof. It has been my observation that when such containers, employing handles of the usual type, are loaded side by side into a truck, the handles are frequently in such a position as to make them difficult to grasp. Furthermore the larger sizes of such containers are frequently moved from place to place by rolling, particularly when loading or unloading a truck. Handles of the usual type are obviously of little use or are at least very unhandy for use in this manner and persons handling such containers by rolling frequently grasp the upper lip or rim of the container. This of course is undesirable for sanitary reasons.

It is accordingly a main object of my invention to provide an improved means for handling and lifting containers of this nature.

A further object of my invention is the provision of a ring-like handle extending entirely around the upper portion of containers such as milk or cream cans, whereby the handle is always available to be grasped, regardless of the position of the container to permit such a container to be quickly and easily handled without danger of mashed fingers.

Other and further features and objects of the invention will be more apparent to those skilled in the art upon a consideration of the accompanying drawing and following specification, wherein are disclosed several exemplary embodiments of the invention, with the understanding, however, that such changes may be made therein as fall within the scope of the appended claim, without departing from the spirit of the invention.

Figure 1:
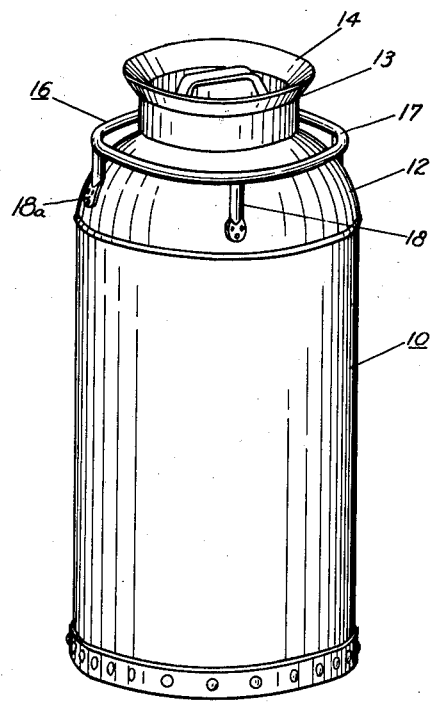
Figure 1 is a view in perspective of a container such as a milk or cream can embodying a handle constructed in accordance with a preferred embodiment of my invention.
Figure 2:
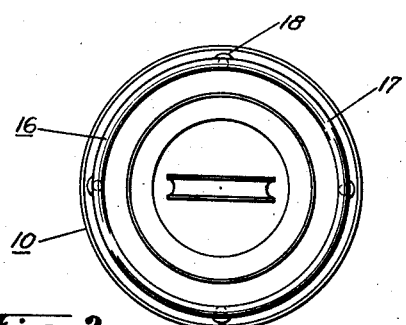
Figure 2 is a view in top elevation of the container shown in Figure 1.

Referring now to the drawing, and to Figures 1 and 2 thereof in particular; milk or cream cans of the usual type are of a form similar to that indicated at 10 in Figure 1. Such containers are usually cylindrical in form with a more or less dome-like upper portion 12 and a funnel-like neck 13. This funnel-like neck is closed by a close-fitting lid 14.

Handles of the usual type are more or less U-shaped and secured to the outer surfaces of the dome-like portion of the container and close to the lower edges thereof as shown. An improved means for handling such containers, and as constructed in accordance with a preferred embodiment of my invention, is illustrated generally at 16 in Figure 1.

This improved handle comprises, in general, a ring-like member 17 preferably formed of a relatively heavy steel rod or pipe, and a plurality of attachment legs 18. The ring member 17 is preferably of a diameter somewhat smaller than the outside diameter of the container in order to maintain a space between the handles of such containers when loaded close against one another.

The supporting legs 18, preferably four in number, may be of the same material as the ring 17—that is, of steel rods or the like. These leg members may, however, be of strap iron bent over at their lower ends so as to closely engage the outer surface of the dome-like portion 12 of the container. These legs, if of solid round or tubular material, may be flattened at their lower ends, as shown at 18a, and may be secured to the ring at spaced intervals by welding or riveting, and the lower flattened ends of the legs riveted, welded or soldered to the dome 12 of the container.

Figure 3:
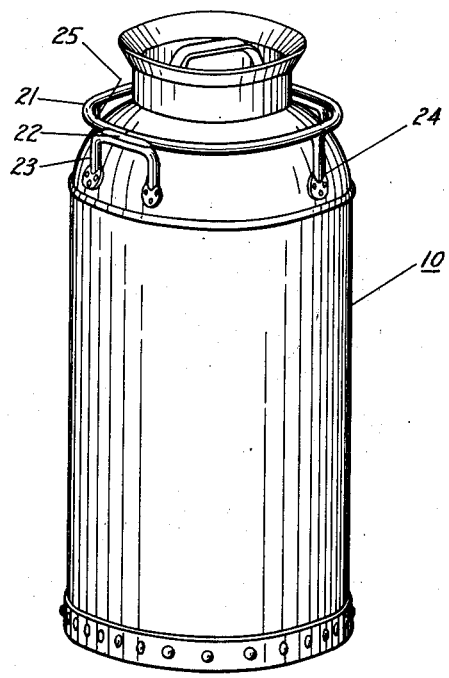
Figure 3 is a view in perspective of a milk or cream can employing handles of the usual type but illustrating a ring-like handle affixed to the usual handles in such a manner as to embody my inventive concept.

In Figure 3 I have illustrated how a milk or cream can of the usual construction may be modified by the addition of a ring-like member to secure the advantages of my invention. This ring-like member, which I have indicated at 21 in Figure 3, may be secured by welding or clamping, as indicated at 22, to the upper edges of the handles 23. It is preferable that additional spacer legs be secured between the ring and the dome-like portion of the container, as shown at 24 and 25, in order to permit the use of a somewhat lighter ring.

It will be obvious, now, that the provision of a handling means, such as I have described, will greatly facilitate the handling of such containers. The handle is always in position to be readily grasped in any position of the can and is still in such a position as to practically eliminate all chance of mashing the fingers of the handler.

Although I have shown and described exemplary embodiments of my invention, it is apparent that modifications thereof may be made by those skilled in the art. Such modifications may be made without departing from the spirit and scope of my invention as set forth in the appended claim.

I claim as my invention:

In a milk can, a lower portion having substantially vertical side walls, a neck portion in the top of the can of smaller diameter than the lower portion, an inwardly and upwardly extending portion connecting said lower and neck portions, a pair of U-shaped handles attached to the inwardly and upwardly extending portion at points diametrically opposite each other, a tubular annulus having a diameter of at least one inch less than the lower portion of the can attached to the upper portion of said U-shaped handles, and a plurality of tubular legs extending from the annulus to the inwardly and upwardly extending portions of the can, said tubular members being flattened at their lower portions to fit the inwardly and upwardly extending portion of the can to which they are attached.

PAUL W. MOLLENHAUER.